United States Patent Office 3,176,390
Patented Apr. 6, 1965

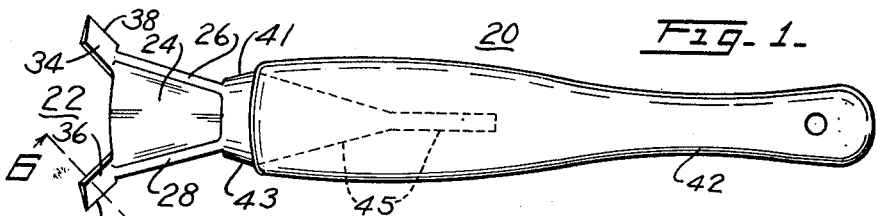
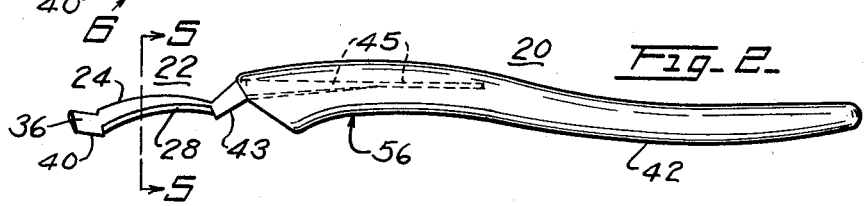
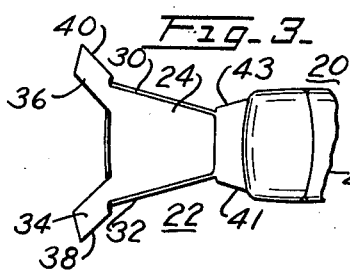
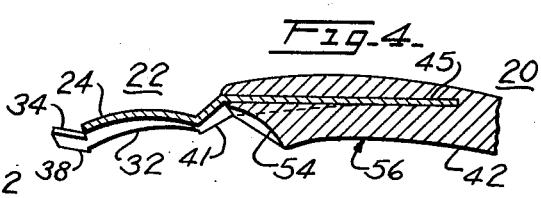
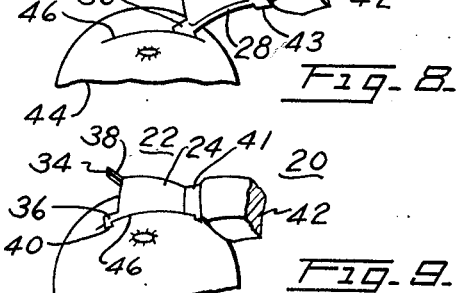
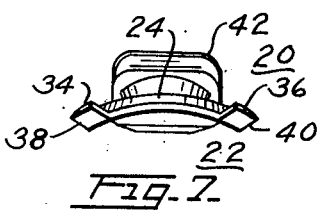
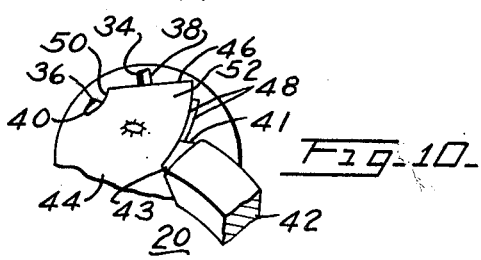
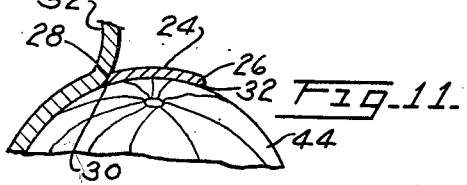
INVENTOR.
JOHN E. ROBINSON
BY
Ray Eilers
ATTORNEY.

3,176,390
FOOD-HANDLING DEVICES
John E. Robinson, Oakes Drive, Crystal City, Mo.
Filed July 20, 1962, Ser. No. 211,250
5 Claims. (Cl. 30—24)

This invention relates to improvements in food-handling devices. More particularly, this invention relates to improvements in devices that can peel fruits having removable peels.

It is, therefore, an object of the present invention to provide an improved device which can peel fruits having removable peels.

It is frequently desirable to peel oranges, tangerines, grape fruits, and other fruits so they can be readily eaten in sections. In peeling such fruits, some persons have been known to use their fingernails to form slits in the peels of those fruits, and then to use their fingers to remove those peels from those fruits. Small portions of the peels of those fruits tended to collect and remain under the fingernails of the persons attempting to peel those fruits; and those persons' fingers tended to become momentarily discolored and damp because of the oils from those peels. Further, where those persons used fingernail polish, that polish tended to crack and chip. In addition, the nails of the persons attempting to peel the fruits frequently tore or broke the membranes which are disposed inwardly of the peels and which normally retain the juices within those fruits. Other persons have been known to use knives to make initial slits in the peels of fruits, and then to use those knives or their fingernails to effect removal of those peels. Quite frequently, the use of knives caused cutting or tearing of the membranes which are disposed inwardly of the peels and which normally retain the juices of the fruits. It would be desirable to provide a peeler which would avoid cutting or tearing of the membrane, that is disposed inwardly of the peel of a fruit which has a removable peel and that normally confines the juice of that fruit, and that would avoid all need of using the fingernails or knives in the peeling process. The present invention provides such a peeler; and it is, therefore, an object of the present invention to provide a peeler which can peel fruit without cutting or tearing the membrane, that underlies the peel and which normally retains the juice of that fruit, and that avoids all need of using the fingernails or a knife in peeling the fruit.

The peeler provided by the present invention has a leading edge with an upper taper thereon that will coact with the peel of a fruit to pry or raise that peel and cause it to separate from the membrane that underlies that peel. The angle of that upper taper is selected so the leading edge of the peeler will not provide a cutting action but, instead, will provide a lifting or prying action—thereby minimizing the likelihood of cutting the membrane. It is, therefore, an object of the present invention to provide a peeler which has a leading edge with an upper taper that is inclined so it provides a lifting or prying action rather than a cutting action for the peel as it moves relative to that peel.

The peeler provided by the present invention has a cutting prong with a cutting edge that is usable to form an initial slit in the peel of the fruit. Such an initial slit is necessary because the leading edge of the tool is a raising or prying edge and is not a cutting edge. However, once the cutting edge of the cutting prong has been used to make the initial slit, that cutting edge will incline upwardly and away from the membrane of the fruit during the peeling operation. As a result, that cutting prong should not cut or tear the membrane of the fruit during the peeling of the fruit. It is, therefore, an object of the present invention to provide a peeler with a cutting edge on a cutting prong that can be used to make an initial slit in the peel of a fruit but that will incline upwardly and away from the membrane of the fruit during the peeling operation.

The cutting edge of the cutting prong will be adjacent one end of a leading edge of the peeler, and a second cutting edge will be adjacent the other end of that leading edge. Both of those cutting edges will extend forwardly of and upwardly from that leading edge. This arrangement is important because it enables those cutting edges to progressively form slits which extend transversely of, and forwardly of, the leading edge of the peeler; and, because those slits are so formed, the leading edge need only pry up the free edge of the elongated strip of the peel formed by those transversely-extending slits. It is, therefore, an object of the present invention to provide a peeler which has cutting edges, adjacent the opposite ends of a leading edge thereof, that extend upwardly from and forwardly of that leading edge to form slits that extend transversely of that leading edge.

The peeler provided by the present invention has two leading edges. One of those leading edges will usually be used whenever the person handling the peeler is left-handed, and the other of those leading edges will usually be used whenever the person handling the peeler is right-handed. In this way, the peeler provided by the present invention can be used by anyone. It is, therefore, an object of the present invention to provide a peeler which has two leading edges; one that will usually be used whenever the person handling the peeler is left-handed and the other usually being used whenever the person handling the peeler is right-handed.

The peeler provided by the present invention has a concave, generally spherical bottom surface; and that surface will abut the membrane of the fruit during the peeling operation. In doing so, that surface will space the leading edges of that peeler away from that membrane, thereby keeping those leading edges from tearing or cutting that membrane. It is, therefore, an object of the present invention to provide a peeler which has a concave, generally spherical surface.

Each of the cutting edges of the peeler provided by the present invention will incline upwardly in two directions from the membrane of the fruit being peeled. Specifically, each of those cutting edges will incline upwardly from that membrane in a plane that is generally normal to the surface of that membrane; and that inclination is important in enabling the upper ends of those cutting edges to extend through, and above the outer surface of, the peel of the fruit. Each of those cutting edges will also incline upwardly from that membrane in a plane that coacts with the surface of that membrane to subtend a small acute angle; and that inclination is important in enabling those cutting edges to help pry up and raise the elongated strip of peel that is formed by those cutting edges during the peeling operation. It is, therefore, an object of the present invention to make the cutting edges of the peeler incline upwardly in two directions from the membrane of the fruit being peeled.

Other and further objects and advantages of the present invention should become apparent from an examination of the drawing and accompanying description.

In the drawing and accompanying description a prefered embodiment of the present invention is shown and described but it is to be understood that the drawing and accompanying description are for the purpose of illustration only and do not limit the invention and that the invention will be defined by the appended claims.

In the drawing,

FIG. 1 is a plan view of one embodiment of peeler that is made in accordance with the principles and teachings of the present invention, FIG. 2 is a side elevational view of the peeler shown in FIG. 1, FIG. 3 is a bottom view of the left-hand end of the peeler of FIG. 1, FIG. 4 is a vertical section through the left-hand end of the peeler of FIG. 1, FIG. 5 is a sectional view, on a larger scale, through the peeler of FIG. 1, and it is taken along the plane indicated by the line 5—5 in FIG. 2, FIG. 6 is a sectional view, on the scale of FIG. 5, through one of the cutting prongs of the peeler of FIG. 1, and it shows that cutting prong as it is turned toward the vertical direction to enable it to be used to form an initial slit in the peel of a fruit, FIG. 7 is an elevational view of the left-hand end of the peeler of FIG. 1, FIG. 8 is a perspective view, on a smaller scale, of part of an orange and of the left-hand end of the peeler of FIG. 1 as one of the cutting prongs of that peeler is used to form the initial slit in that orange, FIG. 9 is a perspective view of the portion of the orange and of the left-hand end of the peeler of FIG. 8, as that peeler has one of the leading edges thereof telescoped into the initial slit formed by the cutting prong, FIG. 10 is a perspective view of the portion of the orange and of the left-hand end of the peeler of FIG. 8, as that peeler is prying and raising the first portion of an elongated strip, and FIG. 11 is a sectional view through the portion of the orange and of the left-hand end of the peeler of FIG. 8.

Referring to the drawing in detail, the numeral 20 generally denotes one embodiment of peeler that is made in accordance with the principles and teachings of the present invention. That peeler has a blade which is generally denoted by the numeral 22 and which has a generally frusto-triangular portion 24. That blade has a concave, generally spherical, bottom surface, and the curvature of that bottom surface is generally complementary to the curvature of an orange of average size.

The inclined sides of the frusto-triangular portion 24 of the blade 22 serve as the leading edges of that peeler, and each of those leading edges has a taper on the upper surface thereof. Specifically, one of those leading edges has an upper taper 26 while the other of those edges has an upper taper 28. Those tapers are sufficiently steep to serve as inclined planes which will raise or pry up the peel of the fruit but should not cut that peel or the membrane underneath that peel. An upper taper which coacts with an adjacent tangent, to the upper surface of the frusto-triangular portion 24, to subtend an angle of about forty-five degrees has been found to be very useful. Each of the leading edges of the peeler also has a taper on the lower surface thereof. Specifically, the leading edge which has the upper taper 26 thereon has a lower taper 32 thereon; and the leading edge which has the upper taper 28 thereon has a lower taper 30 thereon. The lower tapers 30 and 32 space the upper tapers 28 and 26 away from the virtual sphere defined by the bottom surface of the frusto-triangular portion 24, and thereby space those upper tapers upwardly and away from the membrane of the fruit. A lower taper which coacts with an adjacent tangent, to the bottom surface of the frusto-triangular portion 24, to subtend an angle of about forty-five degrees has been found to be very useful.

The upper tapers 26 and 28 are wider than the lower tapers 30 and 32—the upper tapers preferably being approximately three times as wide as the lower tapers. In one preferred embodiment of the present invention, the upper tapers were about three thirty-seconds of an inch wide while the lower tapers were about one thirty-second of an inch wide. The upper and lower tapers 26 and 32 in the one preferred embodiment coacted to subtend an angle of about ninety degrees; and, similarly, the upper and lower tapers 28 and 30 in that one embodiment coacted to subtend an angle of approximately ninety degrees. The apices of those subtended angles were spaced upwardly from the virtual sphere defined by the bottom surface of the frusto-triangular portion 24, and hence from the membrane of a fruit, by a distance approximately equal to one forty-fifth of an inch. As a result, those apices did not cut or tear that membrane during the peeling of that fruit.

The numeral 34 denotes a cutting prong which projects upwardly and away from the frusto-triangular portion 24; and that cutting prong is adjacent the outer end of the leading edge which has the upper taper 26 and the lower taper 32 thereon. That cutting prong has a cutting edge 38 which is shown particularly by FIG. 7. That cutting prong extends upwardly and away from the virtual sphere defined by the bottom surface of the frusto-triangular portion 24, as shown particularly by FIGS. 1, 3 and 7.

A cutting prong 36, which is the counterpart of the cutting prong 34, projects upwardly and away from the frusto-triangular portion 24; and that cutting prong is adjacent the outer end of the leading edge which has the upper taper 28 and the lower taper 30 thereon. That cutting prong has a cutting edge 40 which is shown particularly by FIG. 6. That cutting prong extends upwardly and away from the virtual sphere defined by the bottom surface of the frusto-triangular portion 24, as shown particularly by FIGS. 1, 3 and 7.

The cutting edge 38 of the cutting prong 34 and the cutting edge 40 of the cutting prong 36 are quite sharp. As a result, those cutting edges are quite different from the relatively dull leading edge which has the upper and lower tapers 26 and 32 thereon and from the relatively dull leading edge which has the upper and lower tapers 28 and 30 thereon.

The blade 22 has a cutting edge 41 adjacent the inner end of that leading edge which has the upper taper 26 and the lower taper 32 thereon. That cutting edge extends toward the handle 42 and inclines upwardly and away from the frusto-triangular portion 24, thereby inclining upwardly and away from the virtual sphere defined by the bottom surface of that frusto-triangular portion. A cutting edge 43 is adjacent the inner end of that leading edge which has the upper taper 28 and the lower taper 30 thereon. That cutting edge extends toward the handle 42 and inclines upwardly and away from the frusto-triangular portion 24—thereby inclining upwardly and away from the virtual sphere defined by the bottom surface of that frusto-triangular portion. As emphasized particularly by FIG. 2, the cutting edges 40 and 43 are at the opposite ends of that leading edge which has the tapers 28 and 30 thereon and those cutting edges incline upwardly and away from the virtual sphere defined by the bottom surface of the frusto-triangular portion 24. As emphasized particularly by FIG. 4, the cutting edges 38 and 41 are at the opposite ends of that leading edge which has the tapers 26 and 32 thereon and those cutting edges incline upwardly and away from the virtual sphere defined by the bottom surface of the frusto-triangular portion 24. An elongated portion 45 of the blade 22 extends into the handle 42, as indicated by dotted lines in FIGS. 1 and 2 and by solid lines in FIG. 4. That securing portion fixedly and permanently secures the blade 22 to the handle 42.

The cutting edges 38 and 40 and the cutting edges 41 and 43 project forwardly from the leading edges of the frusto-triangular portion 24, as shown by FIGS. 1 and 3. Specifically, the cutting edges 38 and 41 project forwardly from that leading edge which has the upper taper 26 thereon, while the cutting edges 40 and 43 project forwardly from that leading edge which has the upper taper 28 thereon. This arrangement enables those cutting edges to form slits, during the peeling operation, which extend transversely and forward from those leading edges.

The cutting edges 38, 40, 41 and 43 incline upwardly in two directions from the virtual sphere defined by the bottom surface of the frusto-triangular portion 24. Specifically, each of those cutting edges will incline upwardly from that virtual sphere in a plane that is generally normal to the surface of that virtual sphere; and that inclination is important in enabling the upper ends of those cutting edges to extend through, and above the outer surface of, the peel of the fruit. Each of those cutting edges will also incline upwardly from that virtual sphere in a plane that coacts with the surface of that virtual sphere to subtend a small acute angle; and that inclination is important in enabling those cutting edges to help pry up and raise the elongated strip of peel that will be formed by those cutting edges during the peeling operation.

The numeral 44 denotes an orange or other fruit that has a removable peel; and the peeler 20 provided by the present invention is especially adapted for use in removing such a peel. In peeling the orange 44, the cutting edge 40 of the cutting prong 36 can be used to form an initial slit 46 in the peel; and in making that slit the peeler 20 will be turned so the frusto-triangular portion 24 coacts with the adjacent surface of the orange to subtend an angle of approximately seventy degrees. At such time, the prong 36 will assume the inclination shown in FIG. 6, and the cutting edge 40 can be readily drawn across the peel of the orange 44 to make the initial slit 46. That initial slit should be slightly longer than the length of either of the leading edges of the frusto-triangular portion 24 of the blade 22. Once the initial slit 46 has been formed, the peeler 20 can be set so that leading edge which has the upper and lower tapers 28 and 30 thereon is in register with that slit and so the bottom surface of the frusto-triangular portion 24 of that blade coacts with the adjacent surface of the orange 44 to subtend an angle of less than forty-five degrees. At such time, the said leading edge of the frusto-triangular portion 24 can be pressed down into the initial slit 46, and a force can be applied to the handle 42 which will cause the cutting edge 40 of the cutting prong 36 and the cutting edge 43 to start forming elongated slits 50 and 48 that are substantially normal to the initial slit 46. Because the bottom surface of the frusto-triangular portion 24 of the blade 22 was set to coact with the adjacent portion of the surface of the orange 44 to subtend an angle of less than forty-five degrees, the lower taper 30 will space the apex defined by the tapers 30 and 28 from the membrane adjacent the initial slit 46. This means that the movement of the peeler 20 relative to the orange 44 should not cause cutting or tearing of the membrane. The initial formation of the slits 50 and 48 by the cutting edge 40 of prong 36 and the cutting edge 43 is indicated by FIG. 9.

Continued movement of the peeler 20 in a direction transverse to that leading edge which has the tapers 28 and 30 will elongate the slits 50 and 48, as shown particularly by FIG. 10. As soon as the blade 22 of the peeler 20 has moved far enough to make is possible for the bottom surface of the frusto-triangular portion 24 of that blade to rest upon the membrane of the orange 44, that bottom surface will be pressed into abutting engagement with that membrane, as shown particularly by FIG. 11. At such time, the lower taper 30 will space the apex between the tapers 28 and 30 well above the membrane, and should thereby preclude any cutting or tearing of that membrane. As the blade 22 of the peeler 20 is moved relative to the orange 44, the cutting edges 40 and 43 will continue to elongate the slits 50 and 48, and the upper taper 28 will progressively raise or pry the intermediate strip of peel upwardly and away from the membrane.

The orange 44 can be moved relative to the peeler 20 or that peeler can be moved relative to that orange; but, where desired, the resulting relative movement can easily enable that peeler to form a continuous spiral-like strip. That strip can start adjacent the center of the bottom or the top of the orange 44 and can end adjacent the center of the top or the bottom of that orange; and, as that continuous spiral-like strip is formed, the entire peel of the orange will be removed. The formation and removal of the spiral-like strip facilitates rapid and full removal of the peel from the orange.

The spiral-like strip will usually separate cleanly from the membrane of the orange 44, and hence that orange can usually be readily sectioned. If the elongated core of the orange 44 is to be removed, one or the other of the cutting prongs 34 and 36 can be used to facilitate removal of that core. In some instances, where part of the peel of a fruit has been bruised or is otherwise not in top condition, that part of the peel may not separate cleanly from the membrane. In such instances, one or the other of the cutting prongs 34 and 36 can be used to pry that part of the peel away from that membrane.

Some persons may wish to form a number of separate and distinct strips, rather than just one continuous spiral-like strip, as they peel an orange or other fruit; and the peeler provided by the present invention facilitates the forming of such strips. For example, one or the other of the cutting edges 38 and 40 of the peeler can be used to make an initial slit in the peel of the orange or other fruit; and then that peeler can have one of the leading edges thereof set within that slit and moved perpendicularly to that slit to form a straight strip of peel. That strip of peel can extend half-way or all of the way around the periphery of the orange or other fruit. The peeler can then have the concave, generally spherical, bottom surface thereof placed in engagement with the exposed membrane of the orange or other fruit and can have one of its leading edges inclined to an adjacent edge of the peel of that orange or other fruit. Thereupon, movement of that peeler relative to the orange or other fruit can form a second strip of peel which is separate and distinct from the first strip of peel. Further separate and distinct strips of peel can be formed until the entire peel has been removed.

The handle 42 has a concave portion 54 that enables the blade 22 of the peeler 20 to underlie the peel and to immediately abut the membrane of the fruit during the peeling operation. Further, the bottom surface of that handle is curved in concave fashion, as indicated at 56, to enable the user's forefinger to underlie the handle 42 and yet not interfere with the disposition of the bottom surface of the frusto-triangular portion 24 of the blade 20 in intimate engagement with the membrane of the fruit.

In the event the membrane of a fruit has a radius which is somewhat larger or is somewhat smaller than the radius of curvature of the bottom surface of the frusto-triangular portion 24, that membrane will yield sufficiently to conform to the curvature of that bottom surface of that frusto-triangular portion. In this regard, the spacing of the apex between the upper taper 28 and the lower taper 30 and the spacing of the apex between the upper taper 26 and the lower taper 32 are important because they can keep those apices from cutting or tearing the membranes of fruit which have radii appreciably larger than the radius of curvature of the bottom surface of the frusto-triangular portion 24 of the blade 22. Because of this spacing of those apices, the peeler provided by the present invention can successfully peel grapefruits as well as oranges.

The leading edge which has the upper taper 26 and the lower taper 32 thereon will usually be used whenever the peeler 20 is used by a left-handed person, whereas the leading edge which has the upper taper 28 and the lower taper 30 thereon will usually be used whenever that peeler is used by a right-handed person. However, in either instance the operation of the peeler 20 is the same; and uniformly good results can be obtained by left-handed as well as right-handed persons.

The blade 22 can be made of metal or of plastic material; but it should be made of a metal or plastic material that can be readily sterilized. The handle can be made of metal, wood or plastic material; but it should be capable of being readily sterilized.

The wide upper tapers 26 and 28 are important in prying up or raising the peel from the membrane of the fruit, and they are also important in urging the leading edges of the frusto-triangular portion 24 toward that membrane. In urging the leading edges of the frusto-triangular portion 24 toward that membrane, the wide upper tapers 26 and 28 will help the peeler 20 remove substantially all of the white material intermediate the membrane and the peel of the fruit.

Whereas the drawing and accompanying description have shown and described a preferred embodiment of the present invention, it should be apparent to those skilled in the art that various changes may be made in the form of the invention without affecting the scope thereof.

What I claim is:
1. A peeler that can be used to peel a fruit which has a removable peel and that comprises:
 (a) a blade that has a frusto-triangular portion,
 (b) said frusto-triangular portion having a bottom surface which is concave, which is generally spherical, and which is complementary to the curvature of the membrane of a fruit of average size,
 (c) said frusto-conical portion having a leading edge in the form of an apex,
 (d) said leading edge having an upper taper and a lower taper thereon which define said apex,
 (e) said upper taper coacting with an adjacent tangent to the upper surface of said frusto-triangular portion to subtend an angle of about forty-five degrees,
 (f) said lower taper coacting with an adjacent tangent to the lower surface of said frusto-triangular portion to subtend an angle of about forty-five degrees,
 (g) said upper taper being about three times as wide as said lower taper,
 (h) said lower taper spacing said apex away from the virtual sphere defined by said bottom surface of said frusto-triangular portion,
 (i) said upper taper being adapted to raise the peel of the fruit away from the membrane of that fruit and yet not cut that membrane,
 (j) a cutting prong adjacent the outer end of said leading edge that extends outwardly and away from said frusto-triangular portion and that inclines upwardly and away from said virtual sphere,
 (k) a cutting edge on said cutting prong that inclines upwardly and away from said virtual sphere,
 (l) a cutting edge adjacent the inner end of said leading edge that extends toward the handle of said peeler and that extends outwardly and away from said frusto-triangular portion and that inclines upwardly and away from said virtual sphere,
 (m) said cutting edges responding to movement of said blade relative to said fruit to form elongated slits in said peel that are normal to said leading edge,
 (n) said cutting edge on said cutting prong being usable to remove the core of a fruit and to remove residual portions of the peel of that fruit,
 (o) said handle having a concave portion on the under face thereof adjacent said blade to enable said bottom surface of said frusto-triangular portion to approximately abut the membrane of said fruit,
 (p) said handle having a concave portion on the under surface thereof that is spaced from said blade to enable the user's forefinger to underlie said handle while said frusto-triangular portion abuts said membrane of said fruit,
 (q) said cutting edges inclining upwardly and away from said virtual sphere in a plane that coacts with said virtual sphere to subtend an acute angle, whereby said cutting edges can help raise the peel away from the membrane of that fruit,
 (r) said frusto-triangular portion having the narrow end thereof adjacent said handle and having the wide end thereof spaced away from said handle.

2. A peeler that can be used to peel a fruit which has a removable peel and that comprises:
 (a) a blade that has a portion which can bear against the membrane of a fruit,
 (b) said bearing portion having a bottom surface which is concave, which is generally spherical, and which is complementary to the curvature of the membrane of a fruit of average size,
 (c) said bearing portion having a leading edge in the form of a apex,
 (d) said leading edge having an upper taper and a lower taper thereon which define said apex,
 (e) said upper taper coacting with an adjacent tangent to the upper surface of said bearing portion to subtend an angle of about forty-five degrees,
 (f) said lower taper coacting with an adjacent tangent to the lower surface of said bearing portion to subtend an angle of about forty-five degrees,
 (g) said lower taper spacing said apex away from the virtual sphere defined by said bottom surface of said bearing portion,
 (h) said lower taper being narrow,
 (i) a cutting prong adjacent the outer end of said leading edge of said bearing portion that extends outwardly and away from said bearing portion and that inclines upwardly and away from said virtual sphere,
 (j) a cutting edge on said cutting prong that inclines upwardly and away from said virtual sphere,
 (k) a cutting edge adjacent the inner end of said leading edge that extends toward the handle of said peeler and that extends outwardly and away from said bearing portion and that inclines upwardly and away from said virtual sphere,
 (l) said cutting edges responding to movement of said blade relative to said fruit to form elongated slits in said peel that are normal to said leading edge,
 (m) said cutting edge on said cutting prong being usable to remove the core of a fruit and to remove residual portions of the peel of that fruit,
 (n) said cutting edges inclining upwardly and away from said virtual sphere in a plane that coacts with said virtual sphere to subtend an acute angle, whereby said cutting edges can help raise the peel away from the membrane of that fruit.

3. A peeler that can be used to peel a fruit which has a removable peel and that comprises:
 (a) a blade that has a portion which can bear against the membrane of a fruit,
 (b) said bearing portion having a bottom surface which is curved, which is concave, and which is complementary to the curvature of the membrane of a fruit of average size,
 (c) said bearing portion having a leading edge in the form of an apex,
 (d) said leading edge having an upper taper and a lower taper thereon which define said apex,
 (e) said lower taper spacing said apex away from the virtual surface defined by the bottom surface of said bearing portion,
 (f) said upper taper being adapted to raise the peel of the fruit away from the membrane of that fruit and yet not cut that membrane,
 (g) a cutting prong adjacent the outer end of said leading edge of said bearing portion that extends outwardly and away from said bearing portion and that inclines upwardly and away from said virtual surface,
(h) a cutting edge on said cutting prong that inclines upwardly and away from said virtual surface,
(i) a cutting edge adjacent the inner end of said leading edge that extends toward the handle of said peeler and that extends outwardly and away from said bearing portion and that inclines upwardly and away from said virtual surface,
(j) said cutting edges cutting said peel and simultaneously helping said upper taper on said leading edge of said bearing portion raise said peel away from said membrane.

4. A peeler that can be used to peel a fruit which has a removable peel and that comprises:
(a) a blade that has a portion with a generally spherical bottom surface which can bear against the membrane of a fruit,
(b) said bearing portion having a leading edge in the form of an apex,
(c) said leading edge having an upper taper and a lower taper thereon which define said apex,
(d) said lower taper spacing said apex away from said membrane of said fruit,
(e) said upper taper being adapted to raise the peel of the fruit away from the membrane of that fruit and yet not cut that membrane,
(f) a cutting edge adjacent the outer end of said leading edge of said bearing portion that extends outwardly and away from said bearing portion and thus away from said membrane of said fruit,
(g) a cutting edge adjacent the inner end of said leading edge of said bearing portion that extends outwardly and away from said bearing portion and thus away from said membrane of said fruit,
(h) said bottom surface of said bearing portion acting, whenever it is seated solidly against said membrane of said fruit, to keep said leading edge and said cutting edges from cutting said membrane of said fruit.

5. A peeler that can be used to peel a fruit which has a removable peel and that comprises:
(a) a blade that has a portion with a generally spherical bottom surface which can bear against the membrane of a fruit,
(b) said bearing portion having a leading edge in the form of an apex which is spaced radially outwardly of said bottom surface of said portion and which will raise the peel of said fruit,
(c) a cutting edge adjacent the outer end of said leading edge of said bearing portion that extends outwardly and away from said bottom surface of said bearing portion and thus away from said membrane of said fruit,
(d) a cutting edge adjacent the inner end of said leading edge of said bearing portion that extends outwardly and away from said bottom surface of said bearing portion and thus away from said membrane of said fruit,
(e) said bottom surface of said bearing portion acting, whenever it is seated solidly against said membrane of said fruit to keep said leading edge and said cutting edges from cutting said membrane of said fruit.

References Cited by the Examiner
UNITED STATES PATENTS

| 379,238 | 3/88 | McNeal | 30—24 |
| 1,794,823 | 3/31 | Beechlyn | 30—24 X |
| 2,258,448 | 10/41 | Gesell | 30—24 |

FOREIGN PATENTS

| 657,602 | 9/51 | Great Britain. |

WILLIAM FELDMAN, *Primary Examiner.*